United States Patent [19]
Sakoske

[11] Patent Number: 6,022,624
[45] Date of Patent: Feb. 8, 2000

[54] PARTIALLY CRYSTALLIZING LEAD-FREE ENAMEL COMPOSITION FOR AUTOMOBILE GLASS

[75] Inventor: George E. Sakoske, Mayfield Heights, Ohio

[73] Assignee: Cerdec Corporation, Washington, Pa.

[21] Appl. No.: 09/303,683

[22] Filed: May 3, 1999

Related U.S. Application Data

[62] Division of application No. 09/078,659, May 14, 1998, Pat. No. 5,925,160, which is a division of application No. 08/784,924, Jan. 16, 1997, Pat. No. 5,783,507.

[51] Int. Cl.⁷ .............................. B32B 17/00; B05D 5/00; C03C 17/00
[52] U.S. Cl. ........................ 428/428; 428/426; 427/165; 427/376.2; 427/397.7; 501/17; 501/20; 501/32; 501/79
[58] Field of Search ................................ 427/163.1, 165, 427/376.2, 397.7; 501/17, 20, 32, 79; 428/426, 428

[56] References Cited

U.S. PATENT DOCUMENTS

| | | | |
|---|---|---|---|
| 4,684,389 | 8/1987 | Boaz | 65/24 |
| 4,770,685 | 9/1988 | Boaz | 65/106 |
| 4,857,096 | 8/1989 | Boaz | 65/60.51 |
| 4,882,301 | 11/1989 | Gettys et al. | 501/17 |
| 5,037,783 | 8/1991 | Boaz | 501/19 |
| 5,093,285 | 3/1992 | Murkens | 501/17 |
| 5,153,150 | 10/1992 | Ruderer et al. | 501/17 |
| 5,203,902 | 4/1993 | Murkens | 65/60.53 |
| 5,208,191 | 5/1993 | Ruderer et al. | |
| 5,286,270 | 2/1994 | Ruderer et al. | 65/33 |
| 5,346,651 | 9/1994 | Oprosky et al. | 252/514 |
| 5,578,533 | 11/1996 | Manabe et al. | 501/17 |
| 5,596,590 | 1/1997 | Boaz | 65/60.51 |
| 5,618,764 | 4/1997 | Usui et al. | 501/17 |
| 5,629,247 | 5/1997 | Prunchak | 501/26 |
| 5,691,254 | 11/1997 | Sakamoto et al. | 501/17 |
| 5,707,909 | 1/1998 | Heitmann et al. | 501/59 |
| 5,714,420 | 2/1998 | Sakoske et al. | 501/14 |
| 5,783,507 | 7/1998 | Sakoske | 501/17 |

FOREIGN PATENT DOCUMENTS

| | | |
|---|---|---|
| 6-234547 | 8/1994 | Japan . |
| 7-144933 | 7/1995 | Japan . |

*Primary Examiner*—Shrive Beck
*Assistant Examiner*—Michael Barr
*Attorney, Agent, or Firm*—Wenderoth, Lind & Ponack, L.L.P.

[57] ABSTRACT

A ceramic enamel composition contains 40–80% by weight of at least one lead-free metal oxide frit containing precursors of $Zn_2SiO_4$, such as ZnO and $SiO_2$, wherein the amount of $Zn_2SiO_4$ precursors is less than about 35% by weight of the at least one lead-free metal oxide frit, 0.05–15% by weight of a zinc silicate seed material, and 19–37% by weight of a pigment. The zinc silicate seed material preferably contains crystalline $Zn_2SiO_4$. The enamel preferably also contains a bismuth silicate seed material. The ceramic enamel can be employed as a coating around the periphery of automotive glass and is effective in improving appearance and reducing degradation of underlying adhesives by ultraviolet radiation.

15 Claims, No Drawings

PARTIALLY CRYSTALLIZING LEAD-FREE ENAMEL COMPOSITION FOR AUTOMOBILE GLASS

This application is a division of application Ser. No. 09/078,659, filed May 14, 1998, (now U.S. Pat. No. 5,925,160) which application is, in turn, a divisional of Ser. No. 08/784,924, filed Jan. 16, 1997 (now U.S. Pat. No. 5,783,507.

FIELD OF THE INVENTION

The present invention relates to ceramic enamel compositions for use in automotive windshields, sidelights and backlights.

BACKGROUND OF THE INVENTION

Ceramic enamel compositions can be used for a variety of applications, such as decorative coatings for glassware, chinaware, and the like. They are especially useful in forming colored borders around glass sheets used for automotive windshields, sidelights and backlights. The colored borders enhance appearance as well as prevent degradation of underlying adhesives by UV radiation.

In general, these enamel compositions consist mainly of a glass frit, a colorant and an organic vehicle. They are applied to a desired region of the substrate and subsequently fired to burn off the organic vehicle and fuse the ceramic solids to the surface of the substrate.

Glass sheets for automotive use are generally coated in the desired region with the ceramic enamel composition and then subjected to a pressure forming process at elevated temperatures. During this treatment the enamel melts and fuses to the glass substrate and the glass is formed into a desired final shape. However, many previous coatings exhibit a tendency to adhere to the materials covering the forming die, e.g., a fiberglass or metal fiber covered die, because these conventional enamels have a low viscosity after melting and tend to stick to other materials at high temperature. Accordingly, such previous enamels are not suitable for use in glass forming processes in which the heated glass coated with enamel is pressure formed with a die.

Various approaches have been suggested in order to facilitate the forming of glass sheets with a ceramic enamel coated thereon with-out the enamel adhering to the forming die. For example, U.S. Pat. Nos. 4,596,590 and 4,770,685 (issued to Boaz) propose the addition of a low valent metal oxide powder, e.g., cuprous oxide, to the paint composition to provide a non-stick barrier between the coating and the fiberglass-covered forming die. U.S. Pat. Nos. 4,684,389; 4,857,096; 5,037,783 and EP 490,611 (issued to Boaz), propose adding finely divided zinc metal powder for a similar effect. The use of an iron metal powder is proposed in U.S. Pat. No. 4,983,196 (issued to Stotka).

A purportedly improved anti-stick ceramic enamel composition is proposed by U.S. Pat. Nos. 5,153,150; 5,208,191 and 5,286,270 (issued to Ruderer et al.) wherein a seed powder containing $Zn_2SiO_4$ is combined with the glass frit portion of the composition. The glass frit portion comprises at least 35 percent by weight precursors for crystalline $Zn_2SiO_4$, more particularly, at least 30 weight percent ZnO and at least 5 weight percent $SiO_2$.

A further shortcoming of a number of previous ceramic enamel systems is that they employ a lead-containing glass frit. For environmental considerations it is desirable to avoid the use of any lead-containing system.

Along these lines, U.S. Pat. No. 4,882,301 (issued to Gettys et al.) proposes use of a crystallizing amount of $Cd_2SiO_4$ with a lead borosilicate glass. This reference states that Zn can be substituted directly for Cd in the glass formulation; however, U.S. Pat. No. 5,208,191 indicates that when zinc is substituted for cadmium, the results have been less than desirable.

Also, while several of the above-mentioned enamel systems may perform satisfactorily in conventional glass forming processes, some may not be suitable for use in the newly-developed "deep bend" processes for forming automotive glass. Moreover, the enamel compositions, must resist certain chemical agents which they may contact.

The previous enamel compositions suffer from one or more of the deficiencies noted above. In contrast, the present invention provides a ceramic enamel composition that avoids these shortcomings.

SUMMARY OF THE INVENTION

The present invention is for a lead-free ceramic enamel composition that forms an at least partially crystallizing zinc silicate material on a glass substrate upon fusing at high temperature.

A ceramic enamel composition of the present invention comprises 40–80% by weight of at least one lead-free metal oxide glass frit which contains precursors of $Zn_2SiO_4$, e.g., ZnO and $SiO_2$, of 0.05–15% by weight of a zinc silicate seed material, and 20–35% by weight of a black pigment. The sum of the weight percentage amounts of the aforementioned precursors of $Zn_2SiO_4$ provided by one or more frits is less than about 35%, and more than about 15% by weight of the frit or frits.

The zinc silicate seed material of an instant composition is preferably provided as seed crystals in the composition, which upon firing provide nuclei for further crystal growth. It is preferred that at least a portion of the zinc silicate seed material is crystalline in nature. Preferably, the crystalline seed material comprises at least about 95% by weight of crystalline $Zn_2SiO_4$, for instance, approximately 100% by weight of crystalline $Zn_2SiO_4$.

Another aspect of the invention involves including an additional crystalline material, such as a bismuth silicate seed material, in an enamel composition of the invention. A bismuth silicate seed material is preferably provided in at least about 1% by weight of the enamel composition. Preferably, the bismuth silicate seed material comprises a crystalline bismuth silicate, such as crystalline $Bi_{12}SiO_{20}$, $Bi_4(SiO_4)_3$, $Bi_2SiO_5$, and mixtures thereof, in an amount of about 2 to about 7% by weight.

A method of preparing an instant ceramic enamel composition comprises combining in no particular order the aforementioned components in the desired amounts, and optionally combining them with an organic vehicle.

The present invention also contemplates a method of using the aforementioned ceramic enamel with a glass substrate, e.g., to form a colored border and/or UV resistant border around its periphery. Thus, a glass substrate is provided with a ceramic enamel coating by applying an aforementioned ceramic enamel composition to the glass substrate, optionally applying pressure to the coated glass substrate, and firing the substrate to fuse components of the ceramic enamel composition to the substrate. Among the advantages of an instant enamel are its excellent anti-stick properties, good consistency, broad temperature firing range, low stress, and low cost.

The invention will now be described in more detail with reference to examples.

DETAILED DESCRIPTION OF THE INVENTION

The present invention provides a ceramic enamel composition that contains the following components: (1) at least one conventional lead-free oxide glass frit containing precursors of $Zn_2SiO_4$; (2) a zinc silicate seed material; (3) a colorant (pigment); and, optionally, (4) a vehicle for components (1)–(3). The zinc silicate seed material is believed to assist in nucleating and growing microcrystalline structures, e.g., crystalline zinc silicate phases, in the composition upon firing. Although vehicle (4) is preferably provided in the composition, it can be omitted, and applied later, e.g., at the time of silkscreening, without departing from the essence of the present invention.

Typically, an instant ceramic enamel composition comprises 40–80% by weight of one or more of the aforementioned lead-free oxide glass frits, 0.05–15% by weight of a zinc silicate seed material, and 20–35% by weight of a pigment. More preferably, the lead-free oxide frit is provided in the composition in an amount of 60–65% by weight, the zinc silicate seed material is provided in an amount of 1–5% by weight, and the pigment is provided in an amount of 25–33% by weight. The sum of the weight percentage amounts of the precursors of $Zn_2SiO_4$ provided by one or more of the aforementioned frits is less than about 35% by weight of the frit or frits, and the total of weight percentages of the above-mentioned lead-free metal oxide frit(s), zinc silicate seed material, and pigment does not exceed 100%.

Preferably, an instant ceramic enamel composition comprises 60–63% by weight of a lead-free metal oxide frit or frits containing precursors of $Zn_2SiO_4$, 1–3% by weight of a zinc silicate seed material, and 27–30% by weight of a black pigment. It is also preferred that the total of the weight percentages for the precursors of $Zn_2SiO_4$ provided by one or more frits is less than about 35% by weight, but greater than about 20% by weight.

As for the ratio of $Zn_2SiO_4$ precursors in the glass frit or frits, preferably, the amount of zinc oxide and silicon dioxide provided in an aforementioned at least one lead-free frit is 5–20% and 20–30%, respectively, whenever the total amount of $Zn_2SiO_4$ precursors is 35% by weight. More preferably, the amount of zinc oxide provided in the frit or frits is in the range of 10% to 15%, and the amount of silicon dioxide provided in the frit or frits is in the range of 20% to 25%, whenever the total amount of $Zn_2SiO_4$ precursors is less than about 35% by weight. The zinc precursor can be provided solely by one frit and the silicon precursor can be provided by a different frit, as long as $Zn_2SiO_4$ is formed whenever the enamel composition is fused.

By "precursors of $Zn_2SiO_4$" is meant substances that when fired at high temperature react to form $Zn_2SiO_4$. Chief among such precursors are ZnO and $SiO_2$. Other precursors can be used equivalently to these substances, and are readily apparent to those skilled in the art. Such other precursors include polymers, e.g., siloxanes, and discrete compounds, e.g., organometallic compounds, which decompose to form ZnO or $SiO_2$ upon firing at elevated temperature. The ZnO and $SiO_2$, or parent compounds, can be provided either in the same lead-free frit, or in different frits, which upon firing fuse to generate $Zn_2SiO_4$.

The zinc silicate seed material can be selected from any known phase of the Zn/Si phase system; however, zinc orthosilicate ($Zn_2SiO_4$) is preferred. Preferably, the zinc silicate seed material comprises at least about 90% by weight of crystalline $Zn_2SiO_4$. More preferably, the zinc silicate seed material comprises at least about 95% and up to 100% by weight of crystalline $Zn_2SiO_4$.

As referred to herein, the terms crystal, crystalline, microcrystalline, and the like, mean that the subject material is sufficiently crystalline (ordered) to reveal one or more discrete phase by X-ray diffraction techniques.

While not wishing to be bound by theory, it is believed that the presence of the zinc silicate seed material causes nucleation and growth of crystals leading to increased refractoriness and devitrification. The devitrification involves the separation of microcrystalline structures, such as $Zn_2SiO_4$, and the like, in the fused enamel. The presence of these microcrystalline structures in the fused enamel is believed to greatly reduce the tendency of the enamel to stick to surfaces, e.g., pressing pads, during the shaping of the glass substrate at elevated temperature.

In respect to a lead-free oxide frit employed in the invention, a conventional ceramic oxide frit, such as a zinc-bismuth based frit, can be employed. The frit can contain a boron source in addition to a zinc source. For instance, a frit composed of zinc oxide and boron oxide, and optionally additional materials, can be used. Also, a frit composed of zinc borosilicate, or one composed of a non-crystalline zinc silicate material, can be used. Preferably, such a frit is formulated to generate in situ upon heating the requisite zinc silicate microcrystalline structures. In practice it is preferred to include a crystalline zinc silicate seed material directly in the enamel composition. At least some oxide frit is desirable in the composition in order to provide a flux.

A crystalline zinc silicate material suitable for use in the present invention can be prepared according to any of a number of well-known methods. For instance, $Zn_2SiO_4$ (CAS Registry No. 13597-65-4) can be prepared by heating zinc oxide (ZnO) and $SiO_2$ in a molar ratio of 2:1 at 1300° C. for 72 hours. Other methods of preparing these and related materials are readily apparent to the skilled practitioner.

The particle size for an instant zinc silicate seed material is preferably in the range of 1 to 4 microns, more preferably about 1.8 microns.

Typically, it is preferred also to include a bismuth silicate seed material in an instant composition. While not wishing to be bound by theory, it is believed that the presence of the bismuth silicate seed material causes nucleation and growth of crystals leading to increased refractoriness and devitrification. Devitrification involves the separation of microcrystalline structures, such as $Bi_{12}SiO_{20}$, $Bi_2(SiO_3)_4$, and the like, in the fused enamel. The presence of these microcrystalline structures in the fused enamel is believed to help reduce the tendency of the enamel to stick to surfaces during the shaping of the glass substrate at elevated temperature.

Preferred bismuth silicate seed materials for this type of reactive system can include, but are not limited by, the compounds $Bi_{12}SiO_{20}$, $Bi_4(SiO_4)_3$, $Bi_2SiO_5$, and mixtures thereof. Any one or all of these compounds are preferably crystalline and may be present as a mixture within the same crystalline material.

A crystalline bismuth silicate material suitable for use in the present invention can be prepared according to any of a number of well-known methods. For instance, $Bi_{12}SiO_{20}$ (CAS Registry No. 12377-72-9) can be prepared by heating bismuth oxide and silicon dioxide in a 6:1 molar ratio at up to 840° C. for 16 hours [National Bureau of Standards, *Monogr.*, 25:22 (1985)]. $Bi_4(SiO_4)_3$ (CAS Registry No. 15983-20-7) can be prepared by firing a 2:3 ratio of bismuth oxide and silica at 780° C. for 50 hours, regrinding, and firing at 830° C. for 18 hours [Roob, et al., North Dakota State Univ., *JCPDS Grant-in-Aid Report* (1980)]. $Bi_2SiO_5$ (CAS Registry No. 12027-75-7) can be prepared by melting a 1:1 ratio of bismuth oxide and silicon dioxide at 1000–1040° C., quenching in water, and crystallizing at 400–520° C. for one week [Keller, et al., Mineralogisch-Petro-graphisches Institut, Univ. Heidelberg, Germany, *JCPDS Grant-in-Aid Report* (1984)]. Other methods of preparing these and related materials are readily apparent to the skilled practitioner.

The particle size for an instant bismuth silicate seed material is preferably in the range of 1 to 4 microns, more preferably about 1.8 microns.

Additional crystalline materials can be incorporated in the formulation as fillers, such as alumina-silicate compounds, calcium silicate compounds, boro-alumina-silicate compounds, soda-calcia-alumina-silicate compounds, feldspar compounds, titania, zinc borate, and mixtures thereof. Still further metallic and/or oxide materials, e.g., iron, silicon, zinc, and the like, can be added to enhance desired properties, such as resistance to silver bleed-through, especially when their presence promotes the nucleation and growth of the requisite zinc silicate and bismuth silicate microcrystalline structures.

As presently preferred, an enamel composition of the invention contains a base glass frit which is at least one conventional lead-free frit, such as those commercially available from Cerdec Corporation (Washington, Pa.). Such frits can be employed alone or can be blended to achieve the desired properties. Other suitable zinc-containing frits are well-known in the art.

A representative formulation for a suitable lead-free frit of the present invention has a composition as shown in Table I:

TABLE I

| Oxide | Weight % Range |
|---|---|
| ZnO | 3–15 |
| $SiO_2$ | 10–25 |
| $Bi_2O_3$ | 20–55 |
| $B_2O_3$ | 2–20 |
| $Na_2O$ | 1–10 |
| $K_2O$ | 0–3 |
| $Li_2O$ | 0–3 |
| Cao | 0–10 |
| SrO | 0–10 |
| $TiO_2$ | 0–5 |
| $Al_2O_3$ | 0–5 |
| $ZrO_2$ | 0–5 |
| $F_2$ | 0–3 |

A method of making a frit of this type is disclosed in U.S. Pat. No. 5,346,651 (issued to Oprosky et al.). Such frits have a sufficiently low firing temperature to ensure adequate adhesion to the substrate and also possess low density characteristics.

Exemplary zinc-containing frits suitable for use with the invention are commercially available from Cerdec Corporation as E-8018, E-8009, and E-8008.

A pigment of a ceramic enamel of the invention can be any of those commercially available. Particularly preferred pigments are commercially available from Cerdec Corporation as *2991 pigment, which is a copper chromite black pigment, *2980 pigment, which is a cobalt chromium iron black pigment, and *2987 pigment, which is a nickel manganese iron chromium black pigment.

A vehicle to be employed for use with an instant composition is selected on the basis of its end use application. The vehicle should adequately suspend the particulates and burn off completely upon firing of the composition on the substrate. Vehicles are typically organic and include compositions based on pine oils, vegetable oils, mineral oils, low molecular weight petroleum fractions, tridecyl alcohol, synthetic and natural resins, and the like.

Correspondingly, UV-base vehicles are equally applicable for use in the invention. Such UV-base vehicles are well-known in the art and are generally composed of polymerizable monomers and/or oligomers containing, for example, acrylate or methacrylate functional groups, together with photoinitiators and polymerization inhibitors. Representative vehicles are disclosed in U.S. Pat. Nos. 4,306,012 and 4,649,062. As is recognized, such vehicles are cured with ultraviolet radiation after application to the substrate.

The specific vehicle and amounts employed are selected based upon the specific components of the composition and the desired viscosity. In general, the amount of the vehicle is about 10 to about 40% by weight based upon the total weight of the solid enamel composition.

In general, the enamel compositions are viscous in nature, with the viscosity depending upon the application method employed and the end use. For purposes of screen-printing, viscosities ranging from 10,000 to 80,000, and preferably 35,000 to 65,000, centipoises at 20° C., as determined on a Brookfield Viscometer, #7 spindle at 20 rpm, are appropriate.

To prepare an enamel composition of the invention, a frit is ground to a fine powder using conventional methods and is combined in any order with an aforementioned zinc silicate seed material, a pigment, any bismuth silicate seed material, and any fillers. When the zinc silicate seed material of the composition is desired to comprise a crystalline zinc silicate, it is also added. Other oxides, as discussed above, can be added, as well as materials which resist silver bleed-through. More than one representative of each of the different types of components mentioned above can be provided in the enamel composition.

Once the enamel composition is prepared it can be applied to a glass substrate in a conventional manner, such as by screen printing, decal application, spraying, brushing, roller coating, and the like. Screen printing is preferred when the composition is applied to glass substrates.

After application of the composition to a substrate in a desired pattern, the applied coating is then fired to bond the enamel to the substrate. The firing temperature is generally determined by the frit maturing temperature, and preferably is in a broad temperature range. Typically, the firing range for an instant composition is in the range of 1100–1350° F., more preferably in the range of 1200–1300° F., and most preferably about 125° F. Whenever pressure is applied to the substrate, the pressure is typically in the range of 1 to 3 psi, preferably about 2 psi.

The following examples represent preferred embodiments of the invention. They are presented to explain the invention in more detail, and do not limit the invention.

EXAMPLES

Several exemplary enamel compositions were prepared by conventional methods using the components listed in Table II. The indicated weight percentages are calculated based on a printing medium being excluded from the composition. Frit E-8018 referred to in Table II is a lead-free bismuth-borosilicate frit commercially available from Cerdec Corporation, which has a ZnO content of 14.4 and an $SiO_2$ content of 20.1% by weight. Pigment *2991 is a black pigment commercially available from Cerdec Corporation. Zinc silicate seed was prepared by reacting zinc oxide and silicon dioxide as described, with X-ray diffraction analysis indicating the presence of zinc orthosilicate. Bismuth silicate seed was prepared by reacting bismuth trioxide and silicon as described with X-ray diffraction analysis indicating the presence of eulytite. Identical materials were used for each component in the examples.

TABLE II

| Component | Ex. 1 | Ex. 2 | Ex. 3 | Ex. 4 |
|---|---|---|---|---|
| E-8018 | 63.64 | 63.64 | 63.64 | 62.00 |
| *2991 pigment | 30.30 | 30.30 | 30.30 | 26.00 |
| Bismuth silicate seed | 5.00 | 4.00 | 3.03 | 5.00 |
| Zinc silicate seed | 1.06 | 2.06 | 3.03 | 7.00 |

The present invention has been described above by way of illustration with reference to examples. However, it should be appreciated that the invention is not limited to the particular embodiments set forth above and that certain obvious modifications can be practiced within the scope of the appended claims.

What is claimed is:

1. A glass substrate having an adherent ceramic enamel coating, said substrate being prepared in accordance with the method which comprises:

applying to a glass substrate a ceramic enamel composition comprising:

40–80% by weight of at least one lead-free metal oxide glass frit containing precursors of $Zn_2SiO_4$, wherein the sum of the weight percentage amounts of said precursors of $Zn_2SiO_4$ in said lead-free metal oxide frit is less than about 35% by weight of said lead-free metal oxide frit;

0.05–15% by weight of a zinc silicate seed material; and

19–37% by weight of a pigment, wherein the sum of the weight percentage amounts of said at least one lead-free metal oxide frit, zinc silicate seed material, and pigment does not exceed 100%, and heating the coated glass substrate to an elevated temperature to fuse components of the ceramic enamel composition to the glass substrate.

2. A glass substrate as defined in claim 1, wherein the coating is provided on at least a portion of the periphery of the glass substrate.

3. A glass substrate as defined in claim 1, wherein in the ceramic enamel composition the precursors of $Zn_2SiO_4$ are provided in a single lead-free metal oxide frit.

4. A glass substrate as defined in claim 1, wherein in the ceramic enamel composition the precursors of $Zn_2SiO_4$ are ZnO and $SiO_2$.

5. A glass substrate as defined in claim 1, wherein in the ceramic enamel composition the zinc silicate seed material comprises crystalline $Zn_2SiO_4$.

6. A glass substrate as defined in claim 1, wherein in the ceramic enamel composition the zinc silicate seed material consists essentially of crystalline $Zn_2SiO_4$.

7. A glass substrate according to claim 1, wherein the ceramic enamel composition further comprises a bismuth silicate seed material.

8. A glass substrate according to claim 7, wherein the bismuth silicate seed material comprises crystalline bismuth silicate.

9. A glass substrate according to claim 8, wherein the crystalline bismuth silicate contains at least one crystalline phase selected from the group consisting of $Bi_{12}SiO_{20}$, $Bi_4(SiO_4)_3$, and $Bi_2SiO_5$.

10. A glass substrate according to claim 1, wherein the ceramic enamel composition further comprises a silver bleed-through resistant material containing iron, silicon, or zinc.

11. A glass substrate according to claim 1, wherein the ceramic enamel composition further comprises a crystalline material selected from the group consisting of bismuth silicate compounds, alumina silicate compounds, calcium silicate compounds, boro-alumina-silicate compounds, soda-calcia-alumina-silicate compounds, feldspar compounds, titania, zinc borate, and mixtures thereof.

12. A glass substrate according to claim 11, wherein the ceramic enamel composition further comprises an organic vehicle.

13. A glass substrate according to claim 1, wherein in the ceramic enamel composition the sum of the weight percentage amounts of said precursors of $Zn_2SiO_4$ in said lead-free metal oxide frit is up to 34.5% by weight of said lead-free metal oxide frit.

14. A glass substrate according to claim 4, wherein said precursor ZnO is present in an amount of 5–15% by weight and said precursor $SiO_2$ is present in an amount of 20–30% by weight.

15. A glass substrate according to claim 14, wherein the amount of ZnO is in the range of 10 to 15% by weight and the amount of $SiO_2$ is in the range of 20 to 25% by weight.

* * * * *